(12) United States Patent
Chan et al.

(10) Patent No.: US 6,676,301 B2
(45) Date of Patent: Jan. 13, 2004

(54) ENHANCED OPTICAL COUPLER

(75) Inventors: Benson Chan, Vestal, NY (US); Glen Walden Johnson, Yorktown Heights, NY (US); Joseph Kuczynski, Rochester, MN (US); Gerald Daniel Malagrino, Jr., Rochester, MN (US); James Robert Moon, Oronoco, MN (US); John Henry Sherman, Lisle, NY (US)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 09/894,714

(22) Filed: Jun. 28, 2001

(65) Prior Publication Data

US 2003/0002819 A1 Jan. 2, 2003

(51) Int. Cl.[7] ................................ G02B 6/36
(52) U.S. Cl. .................................... 385/83
(58) Field of Search ........................ 385/83, 85, 59, 385/71, 75, 76, 88, 51, 65

(56) References Cited

U.S. PATENT DOCUMENTS

| | | | |
|---|---|---|---|
| 3,387,252 A | 6/1968 | Rothweiler | 339/38 |
| 4,640,575 A | 2/1987 | Dumas | 350/96.2 |
| 4,767,179 A | 8/1988 | Sampson et al. | 350/96.2 |
| 4,779,950 A | 10/1988 | Williams | 350/96.21 |
| 4,795,354 A | 1/1989 | Owen | 439/137 |
| 4,979,792 A | 12/1990 | Weber et al. | 350/96.2 |
| 5,047,835 A | 9/1991 | Chang | |
| 5,202,949 A | 4/1993 | Hileman et al. | 385/134 |
| 5,233,674 A | 8/1993 | Vladie | |
| 5,243,678 A | 9/1993 | Schaffer et al. | 385/134 |
| 5,333,225 A | 7/1994 | Jacobowitz et al. | 385/93 |
| 5,347,604 A | 9/1994 | Go et al. | |
| 5,499,311 A | 3/1996 | DeCusatis | 385/89 |
| 5,561,727 A | 10/1996 | Akita et al. | |
| 5,689,599 A * | 11/1997 | Shahid | 385/83 |
| 5,764,833 A * | 6/1998 | Kakii et al. | 385/54 |
| 5,967,189 A | 10/1999 | Cheng | 138/89 |
| 6,088,502 A | 7/2000 | Faist et al. | 385/134 |
| 6,210,047 B1 * | 4/2001 | Grois et al. | 385/53 |
| 6,259,856 B1 * | 7/2001 | Shahid | 385/147 |
| 6,431,765 B1 | 8/2002 | Chen et al. | |
| 2003/0007717 A1 | 1/2003 | Chiappetta et al. | |

FOREIGN PATENT DOCUMENTS

| | | | |
|---|---|---|---|
| JP | 6333634 | 12/1994 | H01R/13/52 |
| JP | 7235881 | 9/1995 | H04B/1/034 |
| JP | 8262271 | 10/1996 | G02B/6/36 |
| JP | 9178995 | 7/1997 | G02B/6/44 |
| JP | 9297244 | 11/1997 | G02B/6/36 |
| JP | 10048465 | 2/1998 | G02B/6/36 |
| JP | 11231146 | 8/1999 | G02B/6/00 |
| JP | 00147328 | 5/2000 | G02B/6/42 |

OTHER PUBLICATIONS

U.S. patent application Ser. No. 09/893,812, entitled Processing Protective Plug Insert for Optical Modules, Benson Chan, et al.

U.S. patent application Ser. No. 09/894,934, entitled Enhanced Optical Transceiver Arrangement, Benson Chan, et al.

\* cited by examiner

Primary Examiner—Khiem Nguyen
(74) Attorney, Agent, or Firm—Rabin & Berdo, PC

(57) ABSTRACT

An optical coupler includes a first plate and a second plate superposed over the first plate. At least the second plate has at least one groove formed therein. The at least one groove extends continuously from one edge of the second plate to another edge of the second plate. An optical fiber is disposed in the at least one groove.

19 Claims, 2 Drawing Sheets

ENHANCED OPTICAL COUPLER

CROSS REFERENCE TO RELATED APPLICATIONS

The subject matter of this application is related to the disclosure contained within U.S. patent application Ser. No. 09/xxx,xxx, entitled Enhanced Optical Transceiver Arrangement; and within U.S. patent application Ser. No. 09/xxx,xxx, entitled A Processing Protective Plug Insert for Optical Modules, and assigned to International Business Machines, Corporation, all filed concurrently herewith.

BACKGROUND OF THE INVENTION

1. Field of the Invention

The present invention relates to an enhanced optical coupler, and in particular, to an enhanced optical coupler that is used to optically couple and align a light emitter or light detector with an optical fiber connector.

2. Background Information

Computer and communication systems are now being developed in which optical devices, such as optical fibers, are used as a conduit (also known as a wave guide) for modulated light waves to transmit information. These systems typically include a light emitter or a light detector optically connected to the optical fibers. A typical light emitter may be a so-called edge emitter, or a surface emitter, such as a vertical cavity surface emitting laser (VCSEL). A typical light detector may be a photodiode. A generic term of either a light emitter or a light detector is an "optoelectronic transducer." The optical fibers, which collectively form a fiber-optic cable or ribbon, are typically coupled to the respective light detector and the light emitter, so that optical signals can be transmitted back and forth, for example.

As an example, optoelectronic transducers convert electrical signals to or from the optical signals; the optical signals carry data to a receiver (light detector) from a transmitter (light emitter) via the fiber-optic ribbon at very high speeds. Typically, the optical signals are converted into, or converted from, the associated electrical signals using known circuitry. Such optoelectronic transducers are often used in devices, such as computers, in which data must be transmitted at high rates of speed.

The conventional light emitter allows for integrated two-dimensional array configurations. For example, the active regions of a conventional VCSEL can be arranged in a linear array, for instance 12 active regions spaced about 250 microns apart, or in area arrays, for example, 16×16 arrays or 8×8 arrays. Of course, other arrangements of the arrays are also possible. Nevertheless, linear arrays are typically considered to be preferable for use with optoelectronic transducers, since it is generally considered easier to align the optical fibers that collect the light emitted from the VCSELs in a linear array, than in an area array. Moreover, it is also possible to utilize the active regions singly, i.e., without being arranged in an array.

The optoelectronic transducers are normally located on either input/output cards or port cards that are connected to an input/output card. Moreover, in a computer system, for example, the input/output card (with the optoelectronic transducer attached thereto) is typically connected to a circuit board, for example a mother board. The assembly may then be positioned within a chassis, which is a frame fixed within a computer housing. The chassis serves to hold the assembly within the computer housing.

Typically, each optical fiber of the ribbon is associated with a respective active region. Further, it is conventional for the ends of the optical fibers of the ribbon to terminate in a fiber connector. Such fiber connectors usually have an industry standard configuration, such as the MTP® fiber connectors manufactured by US Conec, Ltd. of Hickory, N.C. However, fiber connectors having the industry standard configuration are not suitable for connecting directly with the sensitive active regions of the typical light emitters or light detectors. Should direct contact occur between the respective active regions and the fiber connector, the fiber connector would likely damage the active regions, causing the light emitter or light detector to become inoperative. It is thus conventional to space the fiber connector away from the active regions. However, as will be appreciated, by providing a space, it thus becomes desirable to provide a way of optically coupling the active regions with the spaced apart fiber connector, so that the optical signals can be accurately and efficiently transmitted therebetween.

One conventional manner of optically coupling the active regions with the fiber connector is to provide a lens assembly in the space therebetween. However, lens assemblies tend to be complicated and expensive. Thus, it is also known to provide a fiber optic coupler between the active regions and the fiber connector. However, the conventional fiber optic coupler has a limited length, due to manufacturing constraints. Thus, the known fiber connectors must be positioned relatively close to the active regions, which may limit design options.

Moreover, it is important to ensure that most of the light emitted from the active regions of the light emitter reaches the respective optical fibers, and that most of the light emitted from the optical fibers reaches the respective active regions of the light detector. It is thus desirable to ensure that the fiber optic coupler is precisely aligned with the respective active regions and the fiber ends disposed within the fiber connector.

SUMMARY OF THE INVENTION

It is, therefore, a principal object of this invention to provide an enhanced optical coupler.

It is another object of the invention to provide an enhanced optical coupler that solves the above mentioned problems.

These and other objects of the present invention are accomplished by the enhanced optical coupler disclosed herein.

According to one aspect of the invention, the optical coupler includes at least two plates disposed in a superposed relationship. In the exemplary aspect of the invention, the plates are essentially rectangular. Although the plates can have other shapes without departing from the spirit and scope of the invention, it is currently believed to be preferable if at least a portion of two end faces, such as opposing end faces, of the plates have a flat, planar configuration. This configuration allows the respective end faces to be brought relatively close to the active regions and fiber connector. Further, the end faces can be arranged perpendicular to a primary surface of the plates, or arranged at an angle. Moreover, one end face can be arranged perpendicularly and the other end face can be angled, for example, the end face closest to the active regions. This angled configuration may help to prevent light from being reflected back to the active regions. Moreover, since the plates are to be superposed together, it is desirable if the abutting surfaces of the plates are flat and planar. Further, the plates can mirror one another in their configuration, or have an asymmetrical configuration. For example, one of the plates may have a notch or a radius formed in the end face to accommodate wiring or other components that may be connected to the light detector/light emitter, so as to not interfere with the placement of the optical coupler.

The plates may be formed from fused silica, ceramic, or a highly filled polymer (i.e., a polymer that has a filling, such as glass), for example. These materials can be readily etched for forming the features of the optical coupler, and allow optical fibers contained within the coupler (which are separate from the optical fibers of the ribbon) to be polished without damaging the end faces of the plates. Further, such materials have similar coefficients of thermal expansion to the optical fibers, so that the various components expand and contract together. In contrast, if the plates were formed of a conventional plastic material, the material would tend to melt and coat the end faces of the optical fibers during the polishing stage. Further, plastic plates would not expand and contract with the fibers.

Moreover, the plates are preferably joined together using an adhesive, such as an epoxy resin, for example. However, the plates may be joined together using other means without departing from the spirit of the invention.

In another aspect of the invention, at least one of the plates, and preferably both of the plates have grooves formed therein. When the plates are superposed and joined together, the respective grooves of one plate face the respective grooves of the other plate to form a plurality of holes in the optical coupler, for accommodating alignment pins and optical fibers. For example, each plate can have a plurality of relatively narrow grooves extending from one side of the plate to an opposite side of the plate. Once the plates are joined together, the narrow grooves will form a plurality of through holes extending through the optical coupler. Each groove is adapted to accommodate one optical fiber therein, so that each optical fiber extends from one end of the plate to the opposite end of the plate. Moreover, each groove is sized according to the overall diameter of the optical fibers.

In another aspect of the invention, the narrow grooves are disposed parallel to each other, and are arranged in a center region of the optical coupler. Although it is believed that this configuration is preferred for use when optically coupling a fiber-optic ribbon to a light emitter or light receiver, variations in the configuration are within the scope of the invention.

In a further aspect of the invention, the optical fibers are bonded within the grooves using an adhesive, such as an epoxy. By way of example, the adhesive can be wicked down the optical fibers from a region of the end faces, after the plates are fixed together. Alternatively, the fibers and/or narrow grooves can be precoated with an adhesive prior to the placement of the optical fibers in the grooves, or the grooves and/or optical fibers can be coated with an adhesive after the optical fibers are placed in the narrow grooves, but prior to the joining of the plates.

Once the optical fibers are fixed within the optical coupler, their respective end faces can be polished to be flush with the respective end faces of the plates. The polishing, which can be performed in any known manner, causes the respective end faces to be very flat, i.e., about two microns from peak to valley. This helps in reducing any scattering of the transmitted light.

In another exemplary aspect of the invention, each plate further has a number of relatively wide grooves extending from one side of the plate to a location intermediate within the plate, for example. That is, once the plates are joined together, the wide grooves will form a plurality of wide blind holes, for example, extending into the optical coupler. Alternatively, the wide grooves can be tailored to extend across the plate, so that the wide grooves form wide through holes. Each wide groove is adapted to accommodate one alignment pin, so that a portion of the alignment pin protrudes out from the end face of the plates for connection with the fiber connector and carrier.

The wide grooves may be disposed parallel to each other, and arranged on flanking sides of the narrow grooves. Further, the wide grooves on each respective face may be spaced apart from each other by a distance that corresponds to industry standards, i.e., so that the alignment pins will be positioned to fit within receiving holes formed in the fiber connector and the carrier.

Each alignment pin may be provided with one or more annular grooves that are disposed in a region of the pin that is received within the wide grooves. The annular grooves provide a space for accommodating an adhesive, such as an epoxy, between the surface of the pins and the surface of the wide grooves. This ensures that adequate adhesive is present, despite the tight tolerance between the grooves and the pins, to secure the pins to the plates. Alternatively, or in addition to the annular grooves, the ends of the pins received within the wide grooves can be provided with a head having a diameter that is greater than a diameter of the rest of the pin. The wide groove can be tailored to have a portion having a greater thickness for accommodating the head of the respective pin, thereby securing the pin therein. Thus, the pins will be prevented from being inadvertently pulled from the grooves during insertion and removal of the optical coupler.

In a further aspect of the invention, the adhesive for fixing the pins can be injected into the respective wide holes after the plates are fixed together, or by precoating the pins with the adhesive prior to their insertion into the holes. It is also contemplated that the pins and/or grooves can be coated with the adhesive prior to the plates being fixed together.

In another exemplary aspect of the invention, each wide groove is in fluid communication with a vent groove. The vent groove extends from the respective wide groove to the outer edge of the optical coupler, and provides a passage that allows excess or expanding adhesive to vent. That is, during curing, the adhesive (such as an epoxy) may expand, causing the pins to be ejected (either partially or totally) from the respective holes. Further, the insertion of the pins into the blind holes can trap air bubbles, which can cause subsequent epoxy blow-out through the hole, and contamination of the end face surfaces of the optical coupler. In either scenario, the optical coupler may be prevented from performing an adequate job of coupling. The vent grooves provide a means of relieving any pressure buildup within the blind holes, thus preventing the above problems. Moreover, although some of the adhesive may be expelled through the vents, it can be directed to an area of the optical coupler where it will not cause damage or undesirable contamination. Further, any adhesive that does end up in the vents will assist in adhering the plates together, by forming a mechanical lock.

In another aspect of the invention, the wide holes are chamfered at their openings. This reduces any sharp edges that may be otherwise located at the openings, and which would otherwise be subject to chipping and cracking during the insertion of the pins within the respective holes.

In a further aspect of the invention, the various grooves may have a v-shaped or other geometrical configuration. A v-shaped configuration may be the easiest configuration to make, from a manufacturing standpoint. Alternatively, each of the grooves may be provided with ½ of a hexagonal configuration, so that once the plates are joined together, the respective holes have a hexagonal shape. Such a shape may be more advantageous for supporting the pins or optical fibers, since such a shape will provide for more supporting surfaces that a v-shaped groove. Moreover, the hexagonal shape will more closely match the shape of the optical fibers, thus reducing voids therebetween that may entrap air and reduce the strength of the bond.

The various grooves may be formed by etching in any conventional manner. For example, the grooves could be etched using known chemical etching techniques or by using lasers. Etching is preferred to other manufacturing techniques, such as molding, since molds tend to degrade overtime. Thus, an optical coupler formed in a mold will not be as accurately formed in an older mold as in a newer mold. In contrast, optical couplers formed using etching techniques will be formed in a consistent manner throughout the manufacturing process. Further, it is difficult to precisely form an optical coupler using molding techniques. For example, in a molded optical coupler, the holes for the optical fibers would tend to be relatively short, for example ¼ inch, since holes of a greater length can not be accurately made in an economical manner. In contrast, an optical coupler manufactured using etching techniques is not limited in size, since the holes are first formed as grooves, which can be made to be any desired length. Moreover, although it is currently believed that etching provides for the most accurate formation of the grooves, the grooves may also be formed using other machining techniques, such as by dicing or grinding.

In use, the prepared optical coupler is joined to the fiber connector by inserting the appropriate pins of the optical coupler into associated holes formed in the fiber connector. The optical coupler is also joined to the carrier of the light emitter/light detector in a similar manner. For example, the carrier may have the light emitter attached thereto, and may be provided with lands that project beyond the light emitter. The lands could be provided with holes that receive the appropriate pins of the optical coupler. In this manner, the optical coupler can be spaced apart from the active regions, for example by a few microns, so as to not directly contact the active regions. Further, the respective pins could be fit into the respective holes using a clearance fit, so that the optical coupler could be actively aligned with the light emitter, for example, in a manner well known to those skilled in the art.

DETAILED DESCRIPTION OF THE PREFERRED EMBODIMENTS

The invention will now be described in more detail by way of example with reference to the embodiments shown in the accompanying figures. It should be kept in mind that the following described embodiments are only presented by way of example and should not be construed as limiting the inventive concept to any particular physical configuration.

Further, in the application, the terms "upper", "lower", "front", "back", "over", "under", and similar such terms are not to be construed as limiting the invention to a particular orientation. Instead, these terms are used only on a relative basis.

Figure 1:
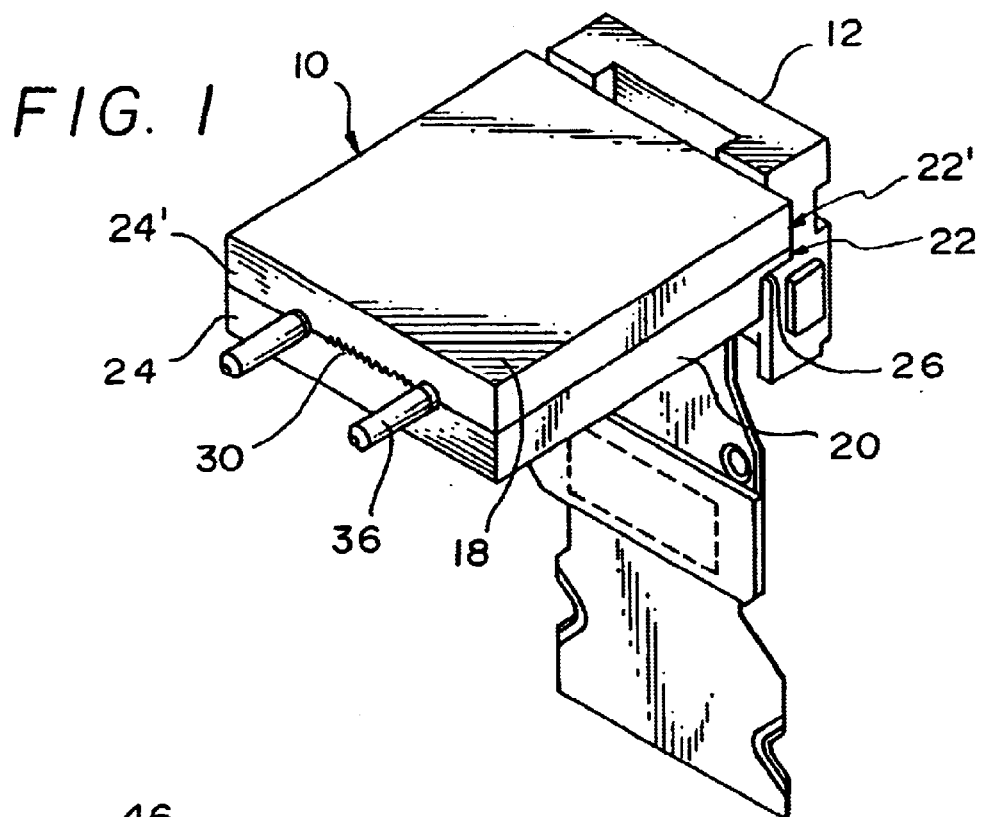
FIG. 1 is a perspective view of an exemplary optical coupler according to the present invention attached to an optoelectronic transducer.
Figure 2:
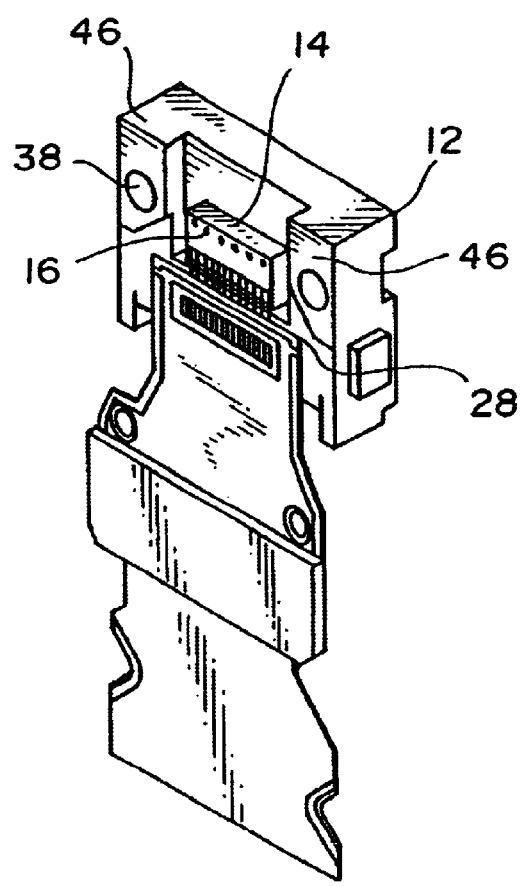
FIG. 2 is a perspective view of the optoelectronic transducer shown in FIG. 1, without the optical coupler being attached.
Figure 3:
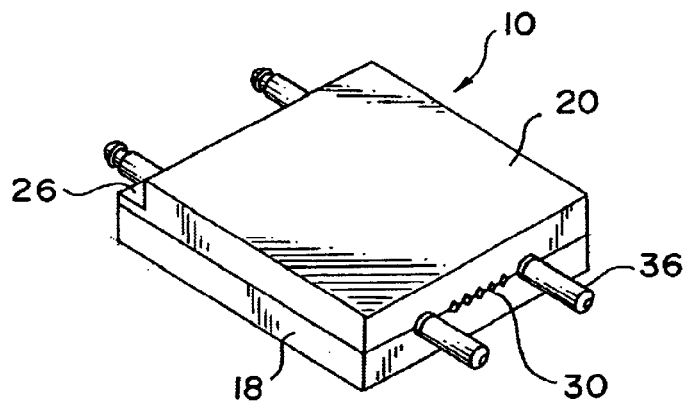
FIG. 3 is a perspective view of the optical coupler shown in FIG. 1, without the optoelectronic transducer being attached.

Referring to FIGS. 1–3, the present invention is directed toward an optical coupler 10. One end of the optical coupler 10 is connectable to a fiber connector (not shown), and another end of the optical coupler is connectable to a carrier 12 that holds a light emitter 14 or light detector (not shown), for example. The optical coupler 10 is adapted to optically couple active regions 16 of the light emitter 14 or light detector with the fiber connector, so that optical signals can be accurately transmitted therebetween.

The optical coupler 10 includes at least two plates 18, 20 disposed in a superposed relationship. In the exemplary illustrated aspect of the invention, the plates 18, 20 are shown as being essentially rectangular. Although the plates 18, 20 can have other shapes without departing from the spirit and scope of the invention, it is currently believed to be preferable if at least a portion of two end faces 22, 22', 24, 24', such as opposing end faces, of the plates have a flat, planar configuration. This configuration allows the respective end faces 22, 22', 24, 24' to be brought relatively close to the active regions 16 and the fiber connector. Moreover, the end faces can be arranged to be perpendicular to the primary surfaces of the plates as shown, or one or more of the end faces, such as the end faces closest to the active regions 16, may be arranged at an acute angle to the primary surface. This angled configuration will help to prevent light from being reflected back to the active regions.

Moreover, since the plates 18, 20 are to be superposed together, it is desirable that the abutting primary surfaces of the plates be flat and planar. Further, the plates 18, 20 can mirror one another in their configuration, or have an asymmetrical configuration. For example, one of the plates 20 may have a relief, such as a notch 26 or a radius formed in the end face 22, to accommodate wiring 28 or other components that may be connected to the light detector/light emitter, so as to ensure that this wiring does not interfere with the placement of the optical coupler 10.

The plates 18, 20 may be formed from fused silica, ceramic, or a highly filled polymer (i.e., a polymer that has a filling, such as glass), for example. These materials can be readily etched for forming the various features of the optical coupler 10, and allow optical fibers 30 contained within the coupler to be polished without damaging the end faces 22, 22', 24, 24' of the plates. Further, such materials have similar coefficients of thermal expansion to optical fibers, allowing the components to expand and contract together. In contrast, if the plates were formed of a conventional plastic material, the material would not expand and contract with the fibers, and would tend to melt and coat the end faces of the optical fibers during the polishing stage.

Moreover, the plates 18, 20 are preferably joined together. For example, the plates 18, 20 can be fixed together using an adhesive, such as an epoxy resin, for example. Alternatively, the plates can be fused together, or joined using mechanical fasteners, for example.

Figure 4:
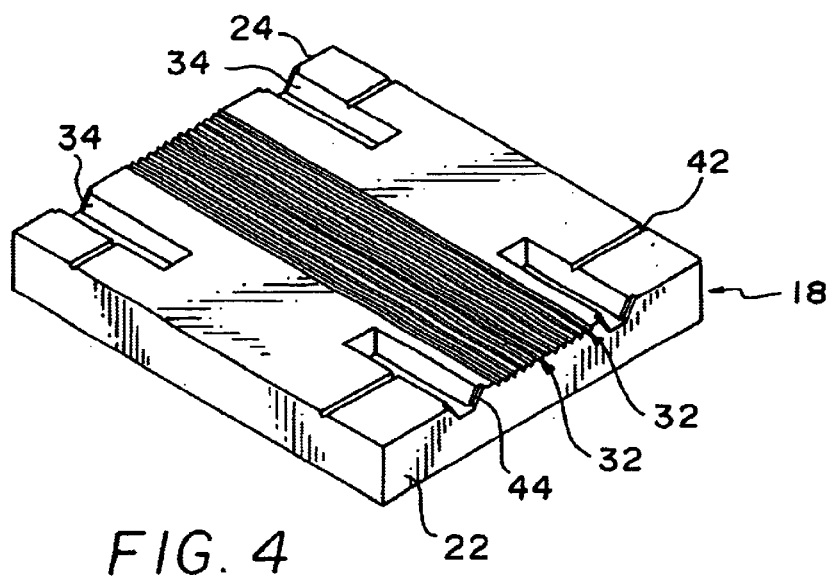
FIG. 4 is a perspective view of a plate of the optical coupler shown in FIG. 1.

Referring also to FIG. 4, at least one of the plates 18, and preferably both of the plates 18, 20 have grooves formed therein. When the plates 18, 20 are superposed and joined together, the respective grooves of one plate 18 face the respective grooves of the other plate 20 to form a plurality of holes in the optical coupler, for accommodating alignment pins and the optical fibers, as will be discussed in more detail in the paragraphs that follow.

For example, each plate 18, 20 can have one or a plurality of relatively narrow grooves 32 extending from one end face 22, 22' of the plate to the opposite end face 24, 24' of the plate. Once the plates 18, 20 are joined together, the narrow grooves 32 will form a plurality of narrow through holes extending through the optical coupler. Each narrow groove 32 is adapted to accommodate one optical fiber 30 (not shown in FIG. 4) therein, so that the optical fiber extends from one end face of the plate to the opposite end face of the plate. Moreover, each narrow groove 32 is sized according to the overall diameter of the optical fibers. In the exemplary illustration, each groove is adapted to accommodate one 50 μm optical fiber having a 125 μm cladding. Further, the illustrated plates are configured to accommodate 12 optical fibers, that is, each plate has 12 narrow grooves, for coupling with a light emitter or light detector having 12 active regions aligned in a linear array. Of course, the number and size of the grooves can be varied within the scope of the invention.

In the illustrated aspect of the invention, the narrow grooves 32 are disposed parallel to each other, and are arranged in a center region of the optical coupler 10. Although it is believed that this configuration is preferred when optically coupling a fiber-optic ribbon to a light emitter or light detector, variations in the configuration are within the scope of the invention.

In a further aspect of the invention, the optical fibers 30 are bonded within the narrow grooves 32 using an adhesive, such as an epoxy. By way of example, the adhesive can be wicked down the optical fibers 30 from a region of the end faces 22, 22', 24, 24', and after the plates 18, 20 are fixed together. Alternatively, the optical fibers 30 and/or narrow grooves 32 can be precoated with an adhesive prior to the placement of the optical fibers in the grooves, or the grooves and/or optical fibers can be coated with an adhesive after the optical fibers are placed in the narrow grooves, but prior to the joining of the plates.

Once the optical fibers 30 are fixed within the grooves 32 of the optical coupler 10, their respective end faces can be polished to be flush with the respective end faces of the plates 18, 20. The polishing, which can be performed in any known manner, causes the respective end faces to be very flat, i.e., to have a surface roughness of about two microns from peak to valley. This helps reduce any scattering of the transmitted light.

In the illustrated exemplary aspect of the invention, each plate 18, 20 further has a number of relatively wide grooves 34 extending from one end face of the plate toward a location intermediate within the plate, for example. That is, once the plates are joined together, the wide grooves 34 will form a plurality of wide blind holes extending into the optical coupler. Alternatively, the wide grooves 34 can extend across the plates, so that the wide grooves form wide through holes (not shown). Each wide groove 34 is adapted to accommodate one alignment pin 36, shown in FIGS. 1, 3 and 5, so that a portion of the alignment pin protrudes out from the respective end faces of the plates for connection with the fiber connector and carrier.

In the illustrated aspect of the invention, the wide grooves 34 are disposed parallel to each other, and are arranged on flanking sides of the narrow grooves 32. Further, the wide grooves 34 on each respective end face are spaced apart from each other by a distance that corresponds to industry standards, i.e., so that the alignment pins 36 will be positioned to fit within receiving holes 38 formed in the carrier 12 (see FIG. 2) and within holes formed in the fiber connector (not shown). For example, the center-to-center distance of the wide grooves 34 on one side of the plates may be 6.3 centimeters, and the center-to-center distance of the wide grooves on the other side of the plates may be 4.6 centimeters.

Figure 5:
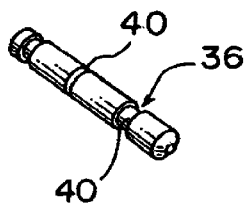
FIG. 5 is a perspective view of an alignment pin of the optical coupler shown in FIG. 1.

As best shown in FIG. 5, each alignment pin 36 may be provided with one or more annular grooves 40 that are disposed in a region of the pin that is received within the wide grooves. The annular grooves 40 provide a space for accommodating an adhesive, such as an epoxy, between the surface of the pins and the surface of the wide grooves. This ensures that adequate adhesive is present, despite the tight tolerance between the wide grooves 34 and the pins 36, to secure the pins to the plates. Alternatively, or in addition to the annular grooves 40, the ends of the pins 36 received within the wide grooves 34 can be provided with a head (not shown) having a diameter that is greater than a diameter of the rest of the pin. The wide groove can then be tailored to have a portion having a greater diameter for accommodating the head of the respective pin, so as to secure the pin therein. Thus, the pins will be prevented from being inadvertently pulled from the wide grooves during insertion and removal of the optical coupler.

In a further aspect of the invention, the adhesive for fixing the pins 36 can be injected into the respective wide holes after the plates 18, 20 are fixed together, or by precoating the pins with the adhesive prior to their insertion into the holes. It is also contemplated that the pins and/or wide grooves can be coated with the adhesive prior to the plates being fixed together.

In another exemplary aspect of the invention, each wide groove 34 is in fluid communication with a vent groove 42. The vent groove 42 extends from the respective wide groove 34 to the outer edge of the optical coupler 10, and provides a passage or channel that allows excess or expanding adhesive to vent. That is, during curing, the adhesive (such as an epoxy) may expand, causing the pins 36 to be ejected (either partially or totally) from the respective holes. Further, the insertion of the pins 36 into the blind holes can trap air bubbles, which can cause subsequent epoxy blow-out through the blind hole, and contamination of the end face surfaces of the optical coupler. In either scenario, the optical coupler may be prevented from performing an adequate job of coupling. The vent grooves 42 provide a means of relieving any pressure buildup within the blind holes, thus preventing the above problems. Moreover, although some of the adhesive may be expelled through the vents, it can be directed to an area of the optical coupler where it will not cause damage or undesirable contamination. Further, any adhesive that does end up in the vents will assist in adhering the plates together.

In another aspect of the invention, the blind holes have chamfered openings 44. This reduces any sharp edges that may be otherwise located at the openings. Sharp edges are undesirable in that they would be subject to chipping and cracking during the insertion of the pins within the respective holes.

In a further aspect of the invention, the various grooves 32, 34, 42 may have a v-shaped or other geometrical configuration. A v-shaped configuration may be the easiest configuration to make, from a manufacturing standpoint. Alternatively, each of the grooves may be provided with ½ of a hexagonal configuration, so that once the plates 18, 20 are joined together, the respective holes have a hexagonal shape. Such a shape may be more advantageous for supporting the pins 36 or optical fibers 30, since such a shape will provide for more supporting surfaces that a v-shaped groove. Moreover, a hexagonal shape will more closely match the shape of the optical fibers and pins, thus reducing voids therebetween that may entrap air and reduce the strength of the bond.

The various grooves 32, 34, 42 may be formed by etching in any conventional manner. For example, the grooves could be etched using known chemical etching techniques or by using lasers. Etching is preferred to other manufacturing techniques, such as molding, since molds tend to degrade overtime. Thus, an optical coupler will not be as accurately formed in an older mold as in a newer mold. In contrast, optical couplers formed using the described etching techniques will be formed in a consistent manner throughout the manufacturing process. Further, it is difficult to precisely form an optical coupler using molding techniques. For example, in a molded optical coupler, the holes for the optical fibers would tend to be relatively short, for example ¼ inch, since holes of a greater length can not be accurately molded in an economical manner. In contrast, an optical coupler manufactured using etching techniques is not limited in size, since the holes are first formed as grooves, which can be made to be any desired length. Moreover, although it is currently believed that etching provides for the most accurate formation of the grooves, the grooves may also be formed using other machining techniques, such as by dicing or grinding.

Referring back to FIGS. 1 and 2, in use, the prepared optical coupler 10 is joined to the fiber connector (not shown) by inserting the appropriate pins 36 of the optical coupler into associated holes formed in the fiber connector. The optical coupler 10 is also joined to the carrier 12 of the light emitter/light detector in a similar manner. For example, the carrier 12 may have the light emitter 14 attached thereto, and may be provided with lands 46 that project beyond the light emitter. The lands 46 could be provided with the holes 38 that receive the appropriate pins of the optical coupler. In this manner, the optical coupler 10 can be spaced apart from the active regions 16, for example by a few microns, so as to not directly contact the active regions. Further, the respective pins 36 could be fit into the respective holes 38 using a clearance fit, to allow the optical coupler 10 to be actively aligned with the light emitter 14, for example, in a manner well known to those skilled in the art.

It should be understood, however, that the invention is not necessarily limited to the specific arrangement and components shown and described above, but may be susceptible to numerous variations within the scope of the invention.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes, and adaptations, and the same are intended to be comprehended within the meaning and range of equivalents of the appended claims.

What is claimed is:

1. An optical coupler, comprising:
   a first plate;
   a second plate superposed over said first plate, and having at least one groove formed in a surface thereof, the at least one groove extending continuously from one end face of said second plate to another end face of said second plate, wherein said second plate comprises a plurality of spaced apart grooves, each extending continuously from the one end face of said second plate to the another end face of said second plate; and
   a plurality of optical fibers, each of said optical fibers being adhered in a respective one of said grooves and extending from the one end face of said second plate to the another end face of said second plate, wherein each of said optical fibers terminates at the respective end faces of said second plate.

2. The optical coupler recited in claim 1, wherein said first plate also includes a plurality of spaced apart grooves, each extending continuously from one end face of said first plate to another end face of said first plate, and each being disposed in alignment with a respective one of the grooves formed in said second plate so as to form a plurality of through holes having said optical fibers disposed therein.

3. An optical coupler, comprising:
   a first plate;
   a second plate superposed over said first plate, and having a plurality of spaced apart grooves formed in a surface thereof, each groove extending continuously from one end face of said second plate to another end face of said second plate:
   wherein said first plate also includes a plurality of spaced apart grooves, each extending continuously from one end face of said first plate to another end face of said first plate, and each being disposed in alignment with a respective one of the grooves formed in said second plate so as to form a plurality of through holes; and
   a plurality of optical fibers, each being adhered in a respective one of the through holes, and extending from the one end face of the respective plates to the another end face of the respective plates,
   wherein each of said optical fibers terminates at respective opposing openings of the respective through holes.

4. The optical coupler recited in claim 1, further comprising a plurality of further grooves formed in the surface of said second plate, each of said further grooves having a width that is greater than a width of individual ones of said spaced apart grooves.

5. The optical coupler recited in claim 4, wherein said further grooves include a first pair of further grooves extending from the one end face of said second plate and terminating in an intermediate region of said second plate, and a second pair of further grooves extending from the another end face of said second plate and terminating in the intermediate region of said second plate.

6. The optical coupler recited in claim 5, wherein said further grooves of each respective pair are disposed to flank opposing sides of said spaced apart grooves.

7. The optical coupler recited in claim 4, further comprising a plurality of alignment pins, each of said alignment pins being disposed in a respective one of said further grooves.

8. An optical coupler, comprising:
   a first plate;
   a second plate superposed over said first plate, and having a plurality of spaced apart grooves formed in a surface thereof, each extending continuously from one end face of said second plate to another end face of said second plate, said second plate also having a plurality of further grooves formed in the surface thereof, each of said further grooves having a width that is greater than a width of individual ones of said spaced apart grooves: and a plurality of alignment pins, each of said alignment pins being disposed in a respective one of said further grooves, and each being adhered in the respective one of said further grooves by an adhesive, said alignment pins extending outward beyond the respective end faces of said second plate, and each of said alignment pins having at least one annular groove formed therein and being disposed within the respective one of said further grooves, the adhesive being received within the respective annular grooves to secure said alignment pins to said second plate.

9. The optical coupler recited in claim 6, wherein said first plate also includes a plurality of further grooves formed in a surface thereof, each of said further grooves in said first plate having a width that is greater than a width of individual ones of said spaced apart grooves in said second plate; said further grooves in said first plate including a first pair of further grooves extending from one end face of said first plate and terminating in an intermediate region of said first plate, and a second pair of further grooves extending from another end face of said first plate and terminating in the intermediate region of said first plate, each respective one of said further grooves in said first plate being disposed in alignment with a respective one of the further grooves formed in said second plate so as to form a plurality of blind holes.

10. An optical coupler, comprising:
a first plate;
a second plate superposed over said first plate, and having a plurality of spaced apart grooves formed in a surface thereof, each groove extending continuously from one end face of said second plate to another end face of said second plate, said second plate also having a plurality of further grooves formed in the surface thereof, each of said further grooves having a width that is greater than a width of individual ones of said spaced apart grooves, said further grooves including a first pair of further grooves extending from the one end face of said second plate and terminating in an intermediate region of said second plate, and a second pair of further grooves extending from the another end face of said second plate and terminating in the intermediate region of said second plate, said further grooves of each respective pair being disposed to flank opposing sides of said spaced apart grooves,
wherein said first plate also includes a plurality of spaced apart grooves, each extending continuously from one end face of said first plate to another end face of said first plate, and each being disposed in alignment with a respective one of the spaced apart grooves formed in said second plate so as to form a plurality of through holes adapted to receive optical fibers therein, said first plate also having a plurality of further grooves formed in a surface thereof, each of said further grooves in said first plate having a width that is greater than a width of individual ones of said spaced apart grooves in said first plate: said further grooves in said first plate including a first pair of further grooves extending from the one end face of said first plate and terminating in an intermediate region of said first plate, and a second pair of further grooves extending from the another end face of said first plate and terminating in the intermediate region of said first plate, each respective one of said further grooves in said first plate being disposed in alignment with a respective one of the further grooves formed in said second plate so as to form a plurality of blind holes; and
a plurality of alignment pins; wherein each of said blind holes has a chamfered opening; and wherein each of said alignment pins is disposed in a respective blind hole, and each of said alignment pins extending to project through a respective chamfered opening and out of said respective blind hole.

11. The optical coupler recited in claim 10, wherein each of said alignment pins is adhered within a respective one of said blind holes.

12. The optical coupler recited in claim 11, further comprising a plurality of vent grooves formed in the surface of at least one of said plates, each of said vent grooves being in fluid communication with a respective one of said blind holes, and extending to an outer edge of said at least one plate.

13. The optical coupler recited in claim 1, wherein the first and second plates are comprised of fused silicon, ceramic or highly-filled polymer.

14. The optical coupler recited in claim 1, wherein said at least one groove has ½ of a hexagonal configuration.

15. An optical coupler arrangement, comprising:
a carrier having lands, and alignment holes formed in the lands;
one of a light emitter and a light detector disposed on said carrier and between respective ones of the lands, said one of a light emitter and said light detector having a plurality of active regions; and
an optical coupler, including:
a first plate having a plurality of first narrow grooves formed in a surface thereof, each of said first narrow grooves extending from one end face to another end face of said first plate, and having a plurality of first wide grooves formed in a the surface thereof, each first wide groove extending from a respective end face toward an intermediate portion of said first plate;
a second plate having a plurality of second narrow grooves formed in a surface thereof, each second narrow groove extending from one end face to another end face of said second plate, and having a plurality of second wide grooves formed in the surface thereof, each second wide groove extending from a respective end face and toward an intermediate portion of said second plate, said second plate being disposed on said first plate so that the respective surfaces are adjoining one another, with said respective first narrow grooves being in alignment with respective ones of said second narrow grooves to form a plurality of narrow through holes, and said respective first wide grooves being in alignment with respective ones of said second wide grooves to form a plurality of wide holes;
a plurality of alignment pins, each being disposed in a respective wide hole, wherein at least some of said alignment pins are positionable within said alignment holes formed in the lands; and
a plurality of optical fibers, each of said optical fibers being disposed in a respective through hole, each of said optical fibers being alignable with respective ones of said active regions.

16. The optical coupler arrangement recited in claim 15, wherein said one of a light emitter and a light detector has wirings connected thereto; and wherein at least one of the end faces of at least one of the plates has a relief formed therein to accommodate at least a portion of said wirings.

17. The optical coupler arrangement recited in claim 15, wherein each of said first plate and said second plate has a plurality of vent grooves formed therein, which collectively form a plurality of vent channels, each of said vent channels being in communication with a respective wide hole.

18. The optical coupler arrangement recited in claim 15, wherein each of said wide holes has a chamfered opening.

19. The optical coupler arrangement recited in claim 15, wherein each of said wide holes is a blind hole.

* * * * *